(12) United States Patent
Tsujioka

(10) Patent No.: US 9,619,189 B2
(45) Date of Patent: Apr. 11, 2017

(54) INFORMATION PROCESSING APPARATUS, INFORMATION COMMUNICATION SYSTEM, AND SERVICE PROVIDING METHOD

(71) Applicant: SEIKO EPSON CORPORATION, Tokyo (JP)

(72) Inventor: Nobuhiro Tsujioka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/666,422

(22) Filed: Mar. 24, 2015

(65) Prior Publication Data
US 2015/0277817 A1 Oct. 1, 2015

(30) Foreign Application Priority Data
Mar. 26, 2014 (JP) .................... 2014-064823

(51) Int. Cl.
*G06K 15/00* (2006.01)
*G06F 3/12* (2006.01)

(52) U.S. Cl.
CPC ............ *G06F 3/1234* (2013.01); *G06F 3/121* (2013.01); *G06F 3/1229* (2013.01); *G06F 3/1289* (2013.01); *G06K 15/408* (2013.01)

(58) Field of Classification Search
USPC .......... 235/381, 380; 705/16; 709/219, 223; 358/1.14
See application file for complete search history.

(56) References Cited

U.S. PATENT DOCUMENTS

| | | | | |
|---|---|---|---|---|
| 2005/0044204 A1* | 2/2005 | Nishikawa | ............. | G06Q 10/10 709/223 |
| 2012/0054318 A1* | 3/2012 | Kim | ............... | G06F 9/5055 709/219 |
| 2012/0136970 A1* | 5/2012 | Chen | ............... | G06F 11/0784 709/219 |
| 2013/0179279 A1* | 7/2013 | Dash | ............... | G06Q 10/20 705/16 |
| 2014/0365592 A1* | 12/2014 | Sun | ............... | G05B 15/02 709/206 |

FOREIGN PATENT DOCUMENTS

| | | |
|---|---|---|
| JP | 2000-341414 | 12/2000 |
| JP | 2011-049691 | 3/2011 |

\* cited by examiner

*Primary Examiner* — Allyson Trail
(74) *Attorney, Agent, or Firm* — Workman Nydegger

(57) ABSTRACT

An information processing apparatus that includes an information processing unit; an information acquisition unit that acquires a set of operational information which varies along with operation of the information processing unit; a reception unit that receives an input operation for requesting an external service providing entity to provide a maintenance service for the information processing apparatus; a communication unit that includes a function of communicating with the service providing entity via a communication line, and that, in response to the input operation, transmits a signal for requesting the provision of the maintenance service, as well as the set of operational information, to the service providing entity.

19 Claims, 7 Drawing Sheets

INFORMATION PROCESSING APPARATUS, INFORMATION COMMUNICATION SYSTEM, AND SERVICE PROVIDING METHOD

BACKGROUND

1. Technical Field

The present invention relates to a maintenance service for an information processing apparatus provided with a communication function.

2. Related Art

In operation of each of various information processing apparatuses, such as a computer, a printer, or a measuring instrument, it is common to entrust a maintenance service to an external service providing entity. Such a maintenance service is provided in a system in which, for example, when an abnormal condition has occurred in an information processing apparatus, a user thereof notifies a maintenance service provider of the occurrence of the abnormal condition, and upon reception of the notification, the maintenance service provider guides the user about a method of resolving the abnormal condition or copes with it by dispatching a service personnel to a place where the information processing apparatus is installed.

As an example of such a service providing method, in JP-A-2011-049691, there is disclosed a system in which, when a call-back request is issued by a service user to a service center established by a service provider, an estimated clock time when a call-back from the service center can be made is transmitted to the user side. This system is intended to eliminate a discontent of the service user to a waiting time until the provision of a required service.

The above existing technology is intended to mitigate a discontent of a user by clearly indicating a waiting time, but does not necessarily make it possible to shorten the waiting time itself. Further, it is not until the establishment of dialogue through a call-back that the content of a request by a service user (a user) is transmitted to a service center, and thus, as a result, it takes further time until the user can obtain his or her desired result.

SUMMARY

An advantage of some aspects of the invention is that an information processing system, an information communication system, and a service providing method are provided, which enable realization of a highly convenient and efficient maintenance service for both of a service provider and a user.

A first aspect of the invention is an information processing apparatus that includes an information processing unit; an information acquisition unit that acquires a set of operational information which varies along with operation of the information processing unit; a reception unit that receives an input operation for requesting an external service providing entity to provide a maintenance service for the information processing apparatus; a communication unit that includes a function of communicating with the service providing entity via a communication line, and that, in response to the input operation, transmits a signal for requesting the provision of the maintenance service, as well as the set of operational information, to the service providing entity.

In the first aspect, when, in accordance with an intention of a user, a service request is issued from the information processing apparatus to the service providing entity, a set of operational information related to the information processing apparatus is transmitted together with the service request. Thus, without depending on an explanation by the user, the service providing entity can correctly understand the status of the information processing apparatus from the set of operational information. Thus, the service providing entity can provide an appropriate service in accordance with the content of the set of operational information.

The above reception unit, for example, may be configured to receive the input operation when there is an abnormal condition in the information processing unit. Through this configuration, it becomes possible to prevent an unnecessary service request from being transmitted because the reception unit does not receive any input operation when there is no abnormal condition in the information processing unit.

In this case, for example, the above communication unit may be configured to transmit the set of operational information including a content of the abnormal condition in the information processing unit. Through this configuration, it is transmitted to the service providing entity what kind of abnormal condition is occurring in the information processing unit, and thus, it becomes possible to promptly provide a maintenance service.

Further, for example, the above information processing unit may be configured to include an image formation unit that forms an image based on image data on a recording medium. This kind of image formation unit is constituted of a large number of constituent parts including movable portions, consumable parts and the like, and thus, in the image formation unit, there are a large number of portions which require a maintenance work based on expertise. Accordingly, an advantageous effect which can be obtained by applying the invention is particularly significant.

Further, the information processing apparatus according to the first aspect of the invention may be configured to, for example, further include a notification unit that notifies information which is transmitted, in response to the signal, by the service providing entity. Through this configuration, it becomes possible to recognize that a service request has been accepted, and further, receive a response to the service request, that is, for example, a set of information related to a method of eliminating the abnormal condition.

Further, a second aspect of the invention is an information communication system that includes the information processing apparatus having any one of the configurations described above; and a server apparatus that is communicably connected to the communication line, and that constitutes at least one portion of the service providing entity. Through this configuration, upon reception of the set of operational information having been transmitted, together with the service request, by the information processing apparatus, the server apparatus analyzes the content of the set of operational information, and thereby can understand the status of the information processing apparatus.

For example, the above server apparatus may be configured to transmit a set of service information in accordance with a content of the set of operational information. Through this configuration, the server apparatus can provide the information processing apparatus with an appropriate set of service information in accordance with the status of the information processing apparatus.

In this case, for example, the above set of service information may be configured to include a piece of information which is related to a start time point of a service provision and which is derived on the basis of the set of operational information. Depending on the status of the information processing apparatus, that is, for example, when it takes a long time to analyze the set of operational information, or when an unexpected abnormal condition is occurring in the information processing apparatus, it is likely to take a long time to provide an appropriate service. Even when such a situation occurs, a start time point having been appropriately derived from the set of operational information is notified to the user in advance, and thereby it becomes possible to mitigate anxiety and/or a discontent of the user.

In these cases, for example, the above information processing apparatus may be configured to further include a notification unit that notifies the set of service information. Through this configuration, the user can receive an appropriate set of service information in accordance with the status of the information processing apparatus.

Further, for example, the above server apparatus may be configured to include a storage unit that stores therein the set of operational information transmitted from the information processing apparatus, and the above communication unit may be configured to further transmit the set of operational information not on the basis of the input operation. Through this configuration, at each of appropriate timing points other than timing points at each of which a service request based on an input operation by a user is issued, the set of operational information is transmitted from the information processing apparatus and is stored in the storage unit of the server apparatus, whereby the server apparatus becomes capable of understanding operational histories of the information processing apparatus before the service request is issued. In this manner, further accurate service provision becomes possible.

A third aspect of the invention is a service providing method for providing an information processing apparatus which is communicably connected to a communication line with a maintenance service. Further, this service providing method includes receiving a set of operational information which varies along with operation of the information processing apparatus, as well as a service request, via the communication line; creating a set of service information to be transmitted to the information processing apparatus, on the basis of the set of operational information; and transmitting the set of service information to the information processing apparatus.

According to this third aspect, the status of the information processing apparatus is understood from a set of operational information which is transmitted together with a service request, and a set of service information in accordance with the status of the information processing apparatus is provided to the information processing apparatus and a user thereof. Thus, similarly to the above information communication system, it is possible to realize a maintenance service which is highly convenient and efficient for both of a service provider and a user.

In this case, for example, the above service providing method may be configured such that the creation of the set of service information and the transmission of the created set of service information are performed at a plurality of mutually different timing points. Through this configuration, it is possible to, in response to a situation in which it frequently becomes necessary to perform modification/addition on the content of the set of service information, provide a user with a constantly appropriate set of service information.

The above set of service information may be configured to include a piece of information related to a start time point of a service provision. Depending on the status of the information processing apparatus, that is, for example, when it takes a long time to analyze the set of operational information, or when an unexpected abnormal condition is occurring in the information processing apparatus, it is likely to take a long time to provide an appropriate service. Even when such a situation occurs, a start time point having been appropriately derived from the set of operational information is notified to the user in advance, and thereby it becomes possible to mitigate anxiety and/or a discontent of the user.

Further, for example, the above set of service information may be configured to include a piece of information for use in eliminating an abnormal condition in the information processing apparatus. Through this configuration, it becomes possible to promptly eliminate a minor abnormal condition which can be eliminated by allowing a user to perform easy works or causing the information processing apparatus to perform control operation of some kind.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
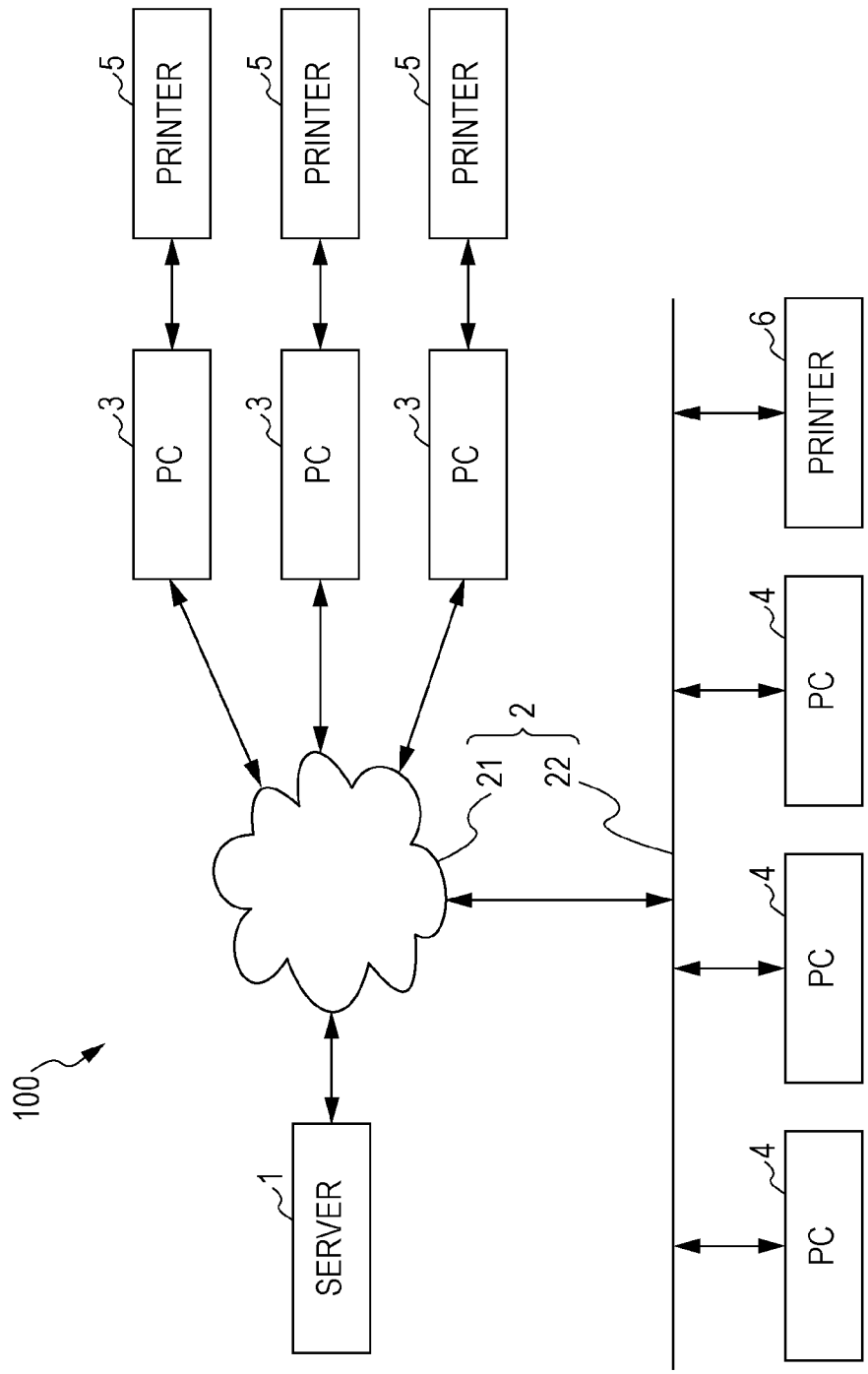
FIG. 1 is a diagram illustrating an embodiment of an information communication system according to the invention.

FIG. 1 is a diagram illustrating an information communication system 100 according to an embodiment of the invention. This information communication system 100 includes a server apparatus 1, a personal computer 3 (4), and a printer 5 (6), which are connected so as to be communicable with one another via one or more communication lines. In addition, the above personal computer is denoted by "PC" in FIG. 1, and will hereinafter be referred to as just a "computer". Speaking in more detail, in this information communication system 100, the server apparatus 1 and the plurality of computers 3 are communicably connected to an internet communication network 21. Further, as described below, the internet communication network 21 is communicably connected to a local area network (LAN) 22 which is provided inside, for example, a company, and this LAN 22 is communicably connected to the plurality of computers 4.

Each of the computers 3 is communicably connected to, and performs control of, a corresponding one of the printers 5. Further, the LAN 22 is also communicably connected to the printer 6, and each of the computers 4 which are communicably connected to the LAN 22 is capable of controlling the printer 6.

In addition, this information communication system 100 is established by configuring such that one server apparatus is communicably connected to at least one computer each controlling a printer, and/or at least one printer, via one or more communication lines. Thus, the number of the computers as well as the number of the printers is not limited to that illustrated in FIG. 1, and may be optionally determined. Further, the configuration of a connection between the server apparatus and the computer may be either such a configuration relating to the computer 3, in which the computer 3 is communicably connected to the server apparatus 1 via the internet communication network 21, or such a configuration relating to the computer 4, in which the computer 4 is communicably connected to the server apparatus 1 via the LAN 22 and the internet communication network 21. Moreover, the configuration of the connection between the server apparatus 1 and the computer 4 may be configured such that the server apparatus 1 and the computer 4 are communicably connected to each other not via both of the internet communication network 21 and the LAN 22, but via only the LAN 22. Hereinafter, the internet communication network 21 and the LAN 22 will be collectively referred to as a communication line 2, except for a case where, particularly, it is necessary to describe them as mutually separated networks. The communication line 2 may be either a wired link or a wireless link, provided that both-way communication can be performed through the communication line 2.

Further, the configuration of a connection between the server apparatus and the printer may be either such a configuration relating to the printer 5, in which the printer 5 is indirectly connected to the communication line 2 via the computer 3, or such a configuration relating to the printer 6, in which the printer 6 is directly connected to the communication line 2 not via any computer. In this regard, however, the printer 6 which is directly connected to the communication line 2 is required to have a network connection function.

The information communication system 100 having such a configuration described above is configured to be capable of remotely monitoring each of the printers 5 and 6 via the communication line 2. Hereinafter, a configuration of each of components which enable realization of the remote monitoring will be described.

Figure 2:
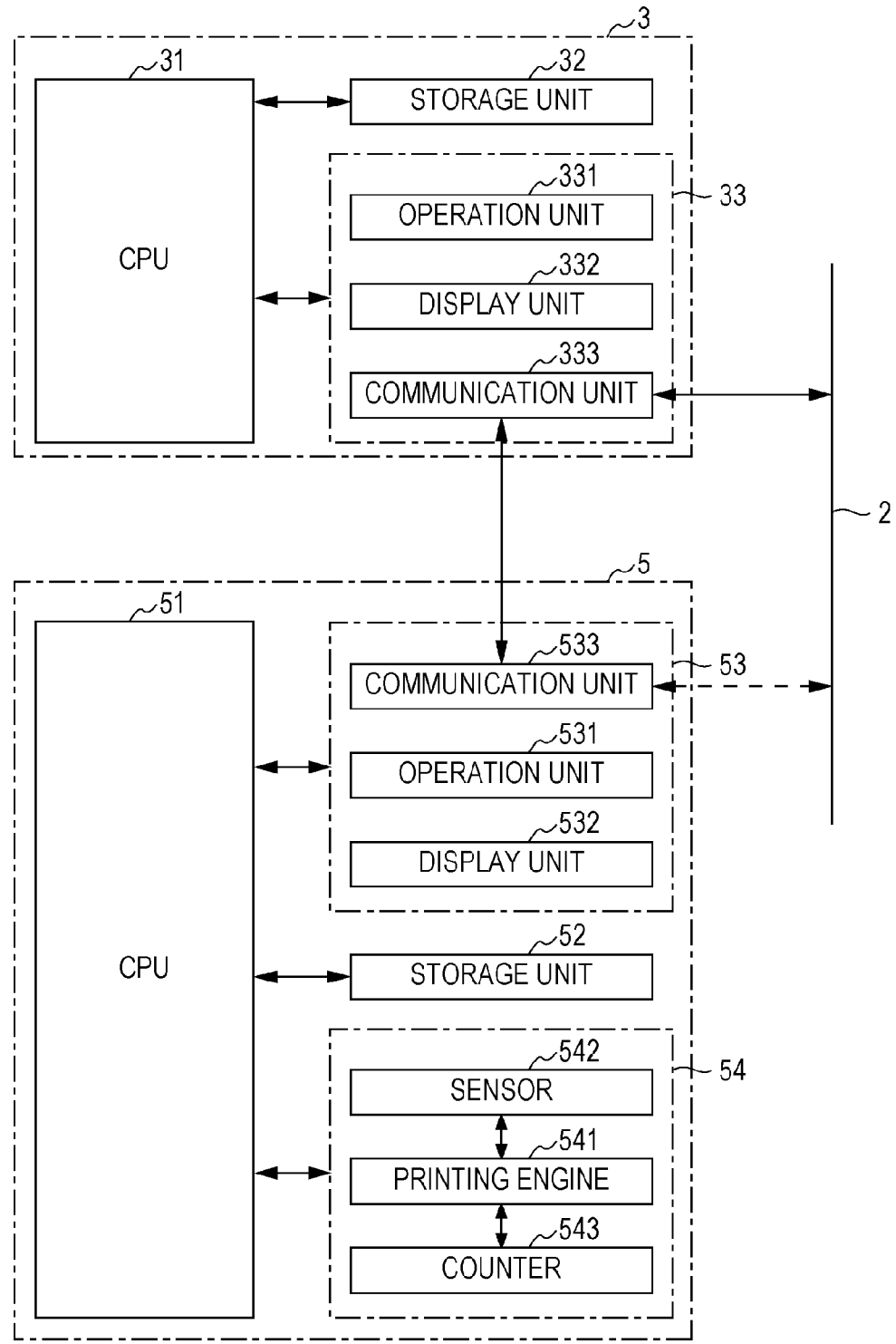
FIG. 2 is a block diagram illustrating configurations of a computer and a printer according to an embodiment of the invention.

FIG. 2 is a block diagram illustrating configurations of the computer 3 and the printer 5. The computer 3 includes a central processing unit (CPU) 31 for performing various arithmetic processes; a storage unit 32 for storing various pieces of information therein; and an interface unit 33 for exchanging information with external devices. It is possible to employ, as the computer 3, a personal computer having a general configuration. It is possible to allow such a computer to realize various functions by installing appropriate kinds of software into the computer. Here, a configuration for realizing functions in relation to remote monitoring of the above-described printers will be described below. In addition, here, the configuration of the computer 3 will be described as a representative configuration, and the configuration of the computer 4 is the same as that of the computer 3.

The CPU 31 of the computer 3 executes software stored in the storage unit 32 and thereby performs control so as to cause individual portions of the computer 3 to perform respective predetermined processes. The storage unit 32 is constituted by, for example, memory devices and a storage having a large storage capacity, and stores therein control programs to be executed by the CPU 31 as well as various pieces of data generated by execution of processes. Further, the storage unit 32 has a function of accumulating and preserving pieces of operational information which are generated along with operation of the printer 5.

The interface unit 33 includes two kinds of components each assuming a user interface, one being an operation unit 331 for receiving input operations by a user, the other one being a display unit 332 for displaying various pieces of information to notify them to the user. The operation unit 331 includes input devices, such as a keyboard and a mouse device. The display unit 332 includes a display device, such as a liquid crystal display. Further, for example, a touch panel having both of the function as the operation unit 331 and the function as the display unit 332 may be provided.

Further, the interface unit 33 includes a communication unit 333 for communicating with other devices to exchange data therewith. The communication unit 333 includes a network connection function for establishing a connection with the communication line 2, and further, a function of communicating with the printer 5 connected to the computer 3. Specifically, the communication unit 333 gives the printer 5 a printing instruction and a package of image data representing the content of an image to be printed, which are transferred from the CPU 31, and in accordance with which the printer 5 performs printing of the image.

The printer 5 is an image formation device for forming images on a recording medium, such as paper, cloth, a resin sheet, or a metal sheet by using recording materials, such as inks and a toner. For such an image formation device, there are various types of recording methods, and any one of them can be applied to the printer 5. Here, for example, it is assumed that an ink jet method is applied to the printer 5. The printer 5 includes a CPU 51 for controlling individual portions of the printer 5 by executing pre-stored firmware; a storage unit 52 for temporarily storing therein image data on the basis of which printing is performed; an interface unit 53 for exchanging data with external devices; and a printing unit 54 for performing printing operation in response to a control instruction from the CPU 51.

The interface unit 53 includes two kinds of components each assuming a user interface, one being an operation unit 531 including buttons for receiving input operations by a user, the other one being a display unit 532 for displaying various pieces of information to notify them to the user. These two kinds of components may be configured to be integrated into, for example, a touch panel. The communication unit 533 is communicably connected to the communication unit 333 of the computer 3, and is configured to receive a printing instruction and image data transmitted from the computer 3, and transmit a set of information representing states of the printer 5 to the computer 3.

The printing unit 54 includes a printing engine 541 which is a main portion for printing operation. The printing engine 541 is configured to, in response to a control instruction from the CPU 51, form an image corresponding to the image data. Further, the printing portion 541 includes sensors 542 for detecting various physical amounts relating to operation states of the printing engine 541, counters 543 for counting various numeric values which vary along with operation of the printing engine 541.

In the case where the printing engine 541 employs an ink jet method, as such physical amounts representing operational states of the printing engine 541, there exist, for example, voltages applied to electric components of the printing engine 541; a temperature and a humidity inside the apparatus; and locations of the printing head and the recording medium. The sensors 542 for detecting such physical amounts include various types of sensors, such as a voltage sensor; a temperature and humidity sensor; a location sensor; and an acceleration sensor. Further, as such numerical values which vary along with operation of the printing engine 541 there exist, for example, a total amount of operating time of the apparatus; a total number of printed sheets; used amounts of inks (or remaining amounts of inks); and accumulated rotation amounts of mechanical components that rotate. Further, the various types of counters 543 each for counting a corresponding one of these numerical values are provided.

Further, pieces of data output from these sensors 542 and counters 543 are stored in the storage unit 52 as pieces of operational information indicating indexes corresponding to operational statuses of the printer 5, and are utilized in operation control of the printing engine 541 performed by the CPU 51. Further, the pieces of operational information are also transmitted to the computer 3 via the communication unit 533. The computer 3 stores these pieces of data in the storage unit 32, and monitors the states of the printer 5 by using these pieces of data. Moreover, the transmission of the pieces of operational information from the computer 3 to the server apparatus 1 enables the server apparatus 1 to remotely monitor the printer 5.

The printer 6, which is directly connected to the communication line 2, basically includes the same configuration as the above-described configuration of the printer 5. In this regard, however, it is necessary to configure the printer 6 as a network printer by, as denoted by a dashed line having arrows in FIG. 2, causing the communication unit 533 to further include a network connection function for, in order to allow the printer 6 to perform communication via the communication line 2, establishing a connection with the communication line 2.

Figure 3:
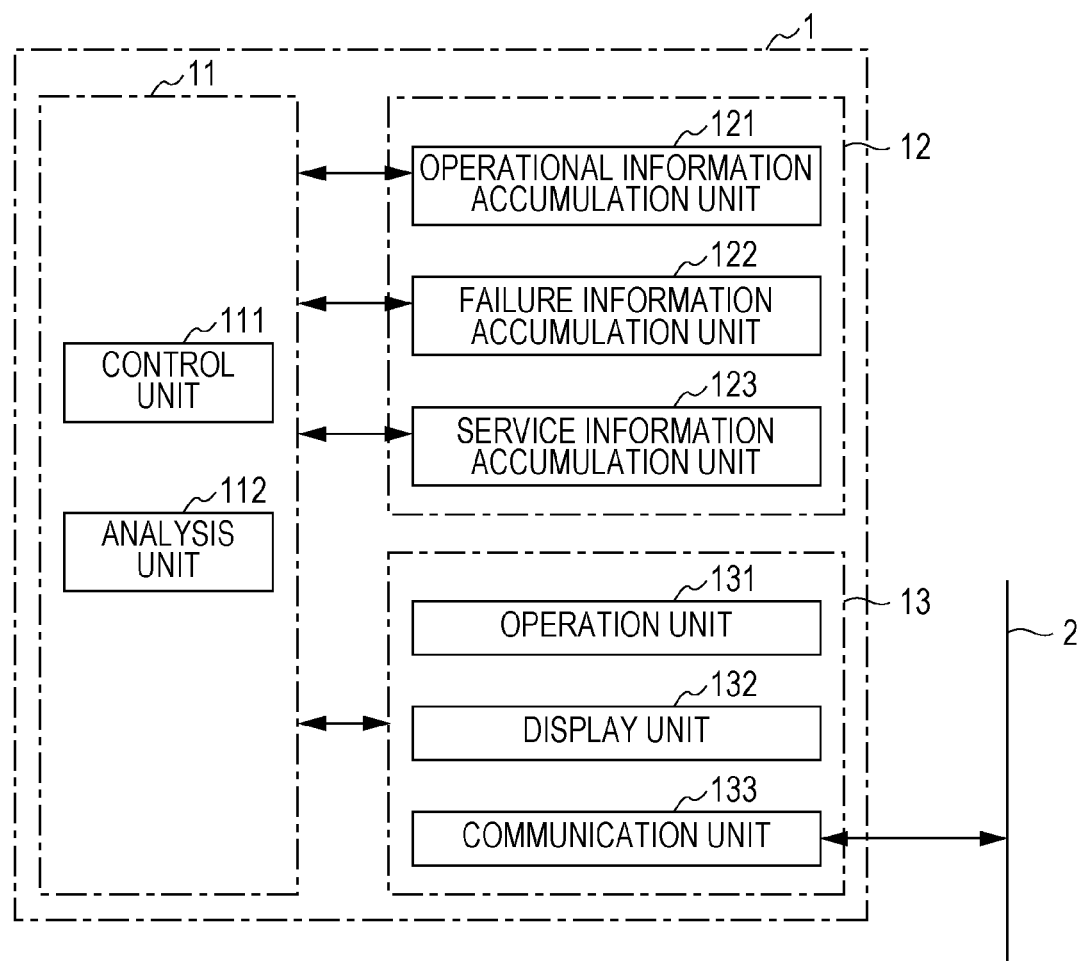
FIG. 3 is a block diagram illustrating a configuration of a server apparatus according to an embodiment of the invention.

FIG. 3 is a block diagram illustrating a configuration of the server apparatus 1. The server apparatus 1 is an apparatus installed by a service provider, which provides a user who installs and operates the printers 5 and 6 with a maintenance service for the printers 5 and 6, and which intends to remotely monitor the printers 5 and 6. This server apparatus 1 includes a CPU 11 for executing predetermined processes while controlling individual portions of the apparatus; a data accumulation unit 12 including a data base constituted of various pieces of data accumulated therein; and an interface unit 13 for exchanging information with external devices.

The CPU 11 includes a control unit 111 for causing individual portions to perform respective predetermined operations by executing preset control programs, and an analysis unit 112 for, on the basis of each of given sets of data, performing a corresponding appropriate analysis process. Further, the data accumulation unit 12 includes an operational information accumulation unit 121, a failure information accumulation unit 122, and a service information accumulation unit 123. The functions of these accumulation units will be described below.

The interface unit 13 includes two kinds of components each assuming a user interface, one being an operation unit 131 for receiving input operations by a user (operator), the other one being a display unit 132 for displaying various pieces of information to notify them to the operator. The operation unit 131 includes input devices, such as a keyboard and a mouse device. The display unit 132 includes a display device, such as a liquid crystal display. Further, the interface unit 13 includes a communication unit 133 for communicating with other devices to exchange data therewith. The communication unit 133 includes a network connection function for establishing a connection with the communication line 2.

In the information communication system 100 configured in such a manner described above, various pieces of operational information which vary along with operation of the printer 5 are transmitted from the computer 3 directly and communicably connected to the printer 5 to the server apparatus 1 via the communication line 2, and similarly, various pieces of operational information which vary along with operation of the printer 6 are transmitted from the printer 6 itself or the computer 4 communicably connected to the printer 6 via LAN to the server apparatus 1 via the communication line 2. The server apparatus 1 individually preserves sets of operational information each related to a corresponding one of the printers 5 and 6, in the operational information accumulation unit 121. Through this operation, sets of operational statuses, each related to a corresponding one of the printers 5 and 6, as well as sets of histories, each related to a corresponding one of the printers 5 and 6, are accumulated in the server apparatus 1. The sets of operational information each having been acquired from a corresponding one of the printers 5 and 6 and having been accumulated in the server apparatus 1 are provided for remote monitoring of the printers 5 and 6.

Moreover, the analysis unit 112 analyzes sets of operational information having been acquired from a corresponding one of a plurality of printers and having been accumulated, whereby it is possible to perform a failure prediction and a causal analysis for the printers. It is also possible to use the results of the analyses as information for use in development of new products. Specifically, when a failure has occurred in a printer, pieces of information related to situations of the failure, which are transmitted from the printer via the communication line 2, or which are sent from a service personnel or the like who performs a maintenance work at a place where the printer is installed, are accumulated and preserved in the failure information accumulation unit 122. The analysis unit 112 performs a correlation analysis between the pieces of operational information having been accumulated in the operational information accumulation unit 121 and the pieces of failure information having been accumulated in the failure information accumulation unit 122, and thereby, causal relationships between sets of operational information and kinds of failures can be obtained.

Further, such causal relationships between sets of operational information and kinds of failures make it easy for a service provider to, when a failure has occurred in a certain one of the printers 5 and 6, find out a kind, a cause, a way of coping and the like regarding the failure from a set of operational information related to the relevant printer. Further, it becomes possible to predict the occurrence of a failure from the sets of histories of operational information related to printers connected to the communication line 2. Moreover, when the occurrence of a failure has been predicted, measures of some kind are taken and thereby it becomes possible to prevent the occurrence of the failure. In this manner, the server apparatus 1 is capable of remotely monitoring each of the printers 5 and 6 on the basis of the accumulated sets of operational information.

Next, the operation which is performed by each of the constituent components in order to make it possible to perform such remote monitoring will be described. First, the operation at the side of the printer 5 (6) targeted for monitoring will be described. This operation encompasses processes of inputting of an operation by a user into an operation unit; notifying to the user by a display unit, and communicating with the server apparatus 1 via a communication unit, and each of these processes may be performed by using any one of the computer 3 (4) and the printer 5 (6) which is communicably connected to the computer 3 (4).

That is, the inputting of an operation by a user may be received by any one of the operation unit 331 of the computer 3 (4) and the operation unit 531 of the printer 5 (6). Further, the notification to a user may be performed by any one of the display unit 332 of the computer 3 (4) and the display unit 532 of the printer 5 (6). Further, the communication with the server apparatus 1 via the communication line 2 may be performed by any one of the communication unit 333 of the computer 3 (4) and the communication unit 533 of the printer 5 (6). In description below, as an example, it is assumed that the above processes are performed by using the interface unit 33 of the computer 3 (4) which mainly manages the printer 5 (6).

Figure 4:
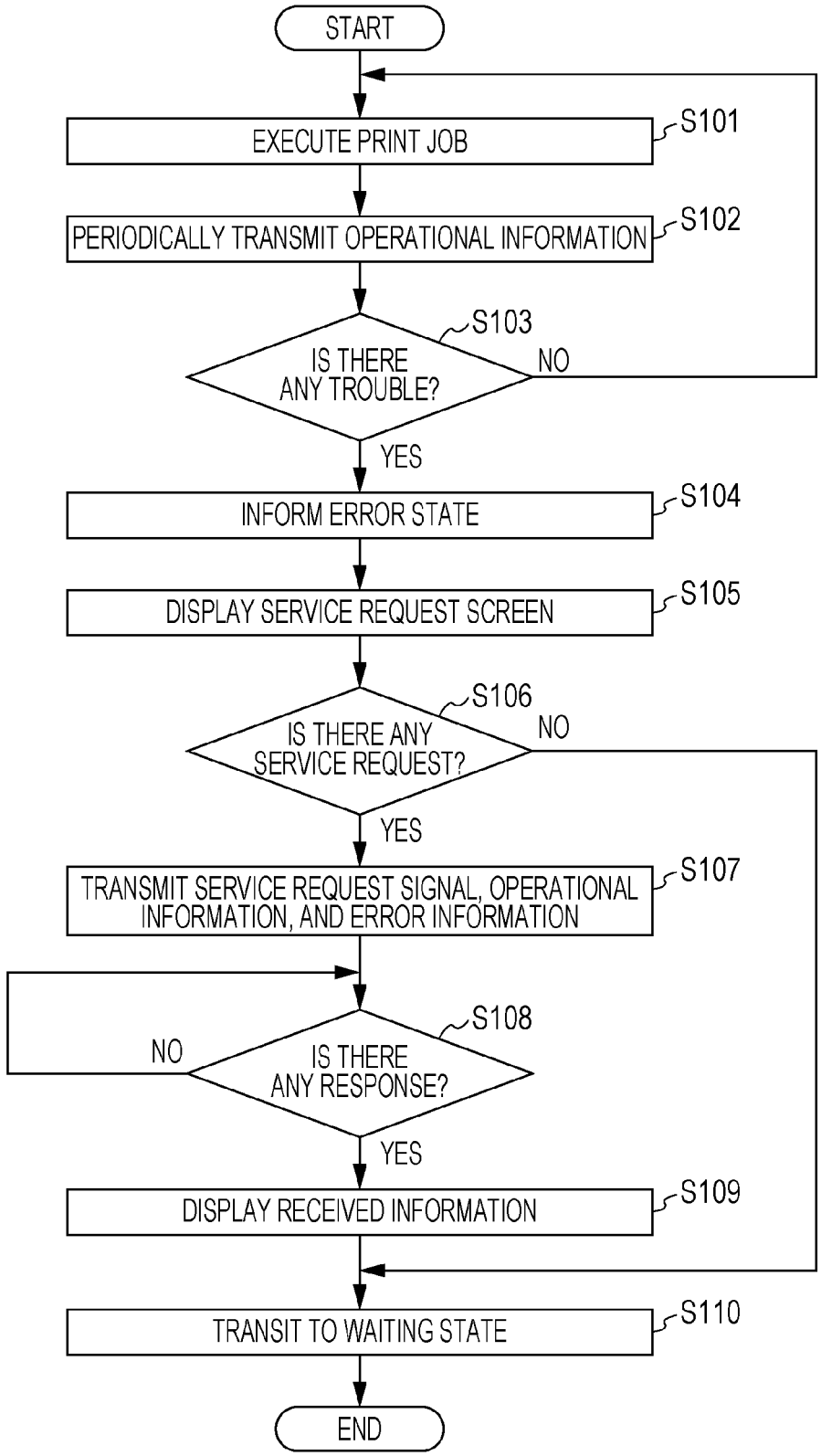
FIG. 4 is a flowchart illustrating computer side operation according to an embodiment of the invention.

FIG. 4 is a flowchart illustrating computer side operation. This operation is realized in a formation in which the computer 3 executes predetermined utility software and performs control of the printer 5, and the computer 3 and the printer 5 cooperate with each other. Alternatively, the operation is realized in a formation in which the computer 4 executes predetermined utility software and performs control of the printer 6, and the computer 4 and the printer 6 cooperate with each other. Further, the operation can be also realized in a formation using no computer, in which the printer 6, a network printer, executes built-in firmware. Here, an example in which operation performed by the computer 3 and the printer 5 which cooperate with each other will be described. This operation is basically the same as operation in any other one of the above formations.

For example, when a print job is generated by inputting of an operation by a user into the printer 5 which is in a waiting state, the print job is executed by the computer 3 and the printer 5 which cooperate with each other (step S101). During this execution of the print job, pieces of information which vary along with the execution of the print job, such as a total number of printed sheets of paper, and used amounts of inks, are stored and preserved as pieces of operational information in the storage unit 32 of the computer 3. The configuration may be made such that a storage process of storing pieces of operational information for each operation is assumed by the printer 5, and a set of stored pieces of operational information data is periodically transferred to the computer 3. The computer 3 periodically transmits sets of operational information related to the printer 5 to the server apparatus 1 at predetermined timing points, that is, at the ends of print jobs, at the intervals of a predetermined period of time, or the like (step S102). When there is no abnormal condition (NO in step S103), a print-job waiting state or a print-job execution state is continued.

In the case where any trouble has occurred in the printer 5 (YES in step S103), a message for indicating that the printer 5 is in an error state is displayed on the display unit 332, and is notified to the user (step S104). Moreover, a service request screen is displayed on the display unit 332 (step S105). Although details will be described below, this service request screen is a screen on which a user indicates online (i.e., via the communication line 2) his or her intention to request a maintenance service to a maintenance service provider with which the user is under a maintenance service contract. In addition, it is preferable that this service request screen is configured to be displayed only when an error of some kind has occurred.

When a user has performed an input operation for making a service request by using the operation unit 331, that is, when a user has indicated his or her intention to desire to receive a maintenance service to a service provider (YES in step S106), a service request signal for conveying that the maintenance service has been requested is transmitted from the computer 3 to the server apparatus 1 via the communication line 2. At this time, a piece of object identification information for identifying the printer 5, such as a printer ID, a set of operational information related to the printer 5 as of then, and a set of error information related to the content of the error having occurred are transmitted to the server apparatus 1 together with the service request signal (step S107). The set of operational information may include not only pieces of data output from the above-described sensors 542 and counters 543, but also pieces of setting information related to the printer 5 and pieces of information related to the print job.

As described below, upon reception of the service request signal, the server apparatus 1 sends back a set of service information of some kind related to maintenance for the printer 5 to the computer 3. Upon reception of this sent-back set of service information (step S108), the computer 3 displays the received set of service information on the display unit 332 to notify it to the user. Thereafter, the computer 3 and the printer 5 each enter a waiting state in which they wait for a new operation (step S110). During this waiting state, there is a case in which a piece of service information is transmitted from the server apparatus 1 a plurality of times, and every time the computer 3 receives this new piece of service information, the computer 3 displays it on the display unit 332.

Meanwhile, in the case where, until an elapse of a predetermined period of time after the notification of the set of error information, any input operation has not been received from the user (NO in step S106), any service request signal is not transmitted and each of the computer 3 and the printer 5 enters a waiting state (step S110). In this regard, however, when an input operation for making a service request has been received from the user, or when a piece of service information of some kind has been received from the server apparatus 1, the computer 3 and the printer 5 operate in response thereto.

Figure 5:
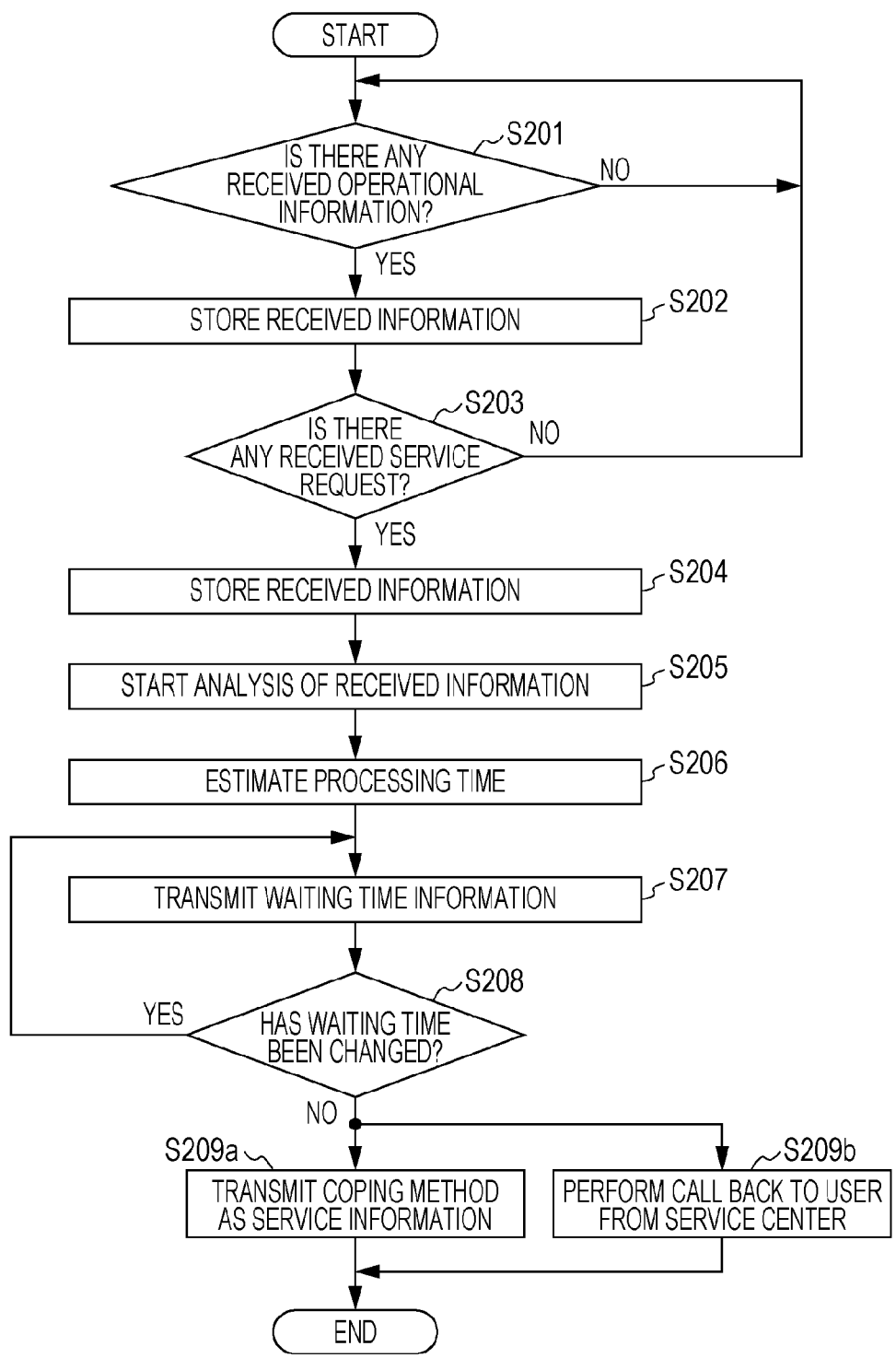
FIG. 5 is a flowchart illustrating server apparatus side operation according to an embodiment of the invention.

FIG. 5 is a flowchart illustrating server apparatus side operation. The server apparatus 1 is always waiting for reception of a piece of information of some kind transmitted from any one of the computers 3 which are communicably connected to the communication line 2 (step S201). When having received a set of operational information which has been transmitted from one of the computers 3 each being communicably connected to the communication line 2 and periodically transmitting a set of operational information, and which is related to the printer 5 managed by the relevant computer 3 (YES in step S201), the server apparatus 1 stores and accumulates the received set of operational information in an accumulation area which is associated with the relevant printer 5 and which constitutes accumulation areas which are included in the operational information accumulation unit 121 and each of which is associated with a corresponding one of the printers 5 and 6 (step S202).

Meanwhile, when having received a service request signal from one of the computers 3 (step S203), the server apparatus 1 stores sets of information having received together with the service request signal into the data accumulation unit 12 (step S204). Specifically, a set of operational information and a set of error information which have been transmitted from one of the computers 3 and which are related to a printer 5 managed by the relevant computer 3 are stored in the operational information accumulation unit 121. In the case where the set of error information is related to a failure of the printer 5, a piece of information for notifying this fact is stored and preserved in the failure information accumulation unit 122.

The analysis unit 112 of the server apparatus 1 analyzes the received set of operational information and set of error information and thereby starts identification of a cause of the error and searching for a method of coping with the error (step S205). In the analysis of the set of operational information and the set of error information, for example, a correlation analysis method is applicable, which is a method for analyzing correlations between operational histories of the relevant printer 5, represented by the sets of operational information accumulated in the operational information accumulation unit 121, and past failure case examples accumulated in the failure information accumulation unit 122. Further, with respect to an error for which there is no past failure case example, for example, an engineer can search for a cause of the error by investigating operational histories of the relevant printer 5. For the purpose of this investigation, the user interface function provided in the interface unit 13 of the server apparatus 1 can be used.

Further, a processing time required until a presentation of a response of some kind to the service request from the user is estimated (step S206). This processing time includes a period of time required until the analysis unit 112 or an engineer analyzes the set of operational information and thereby finds out a method of coping, and a waiting time required until an operator who guides the method of coping to the user completes his or her preparation. An expected waiting time required until the user receives a response to the service request is set from the obtained processing time, and a piece of waiting time information indicating the expected waiting time is transmitted from the server apparatus 1 to the computer 3 as a piece of service information (step S207). When, during a procedure of the analysis, it has become obvious that a change occurs in the waiting time of the user (step S208), a piece of waiting time information is transmitted again (step S209).

When, as a result of the analysis, a method of coping with the error has been found out, the content thereof is notified to the user. With respect to a method of the notification, there are two kinds of method, one being a method in which a piece of service information is transmitted from the server apparatus 1 to the computer 3 (step S209*a*), the other one being a method in which the service provider directly makes a notice to the user (step S209*b*). Moreover, as the method in which the service provider directly makes a notice to the user, there are some methods, such as a method in which the service provider sends an e-mail or a facsimile to a pre-designated notice destination, or a method in which an operator calls back to the user, for example, by telephone, from a service center administrated by the service provider. Further, these methods may be concurrently used in operation. The selection from these methods is made in accordance with, for example, a desire of the user.

A time point at which a notice is made to the user is made a time point corresponding to the waiting time having already been transmitted, and thus, the user does not need to wait excursively until reception of a notice from the service provider. Further, when having received a call back from an operator, since the operator has already understood the set of operational information related to the relevant printer 5, the user does not need to explain all of present situations, and occasionally, at that time point, a method of coping has already become obvious. Accordingly, an efficient maintenance service can be realized for not only the user, but also the service provider.

Figure 6:
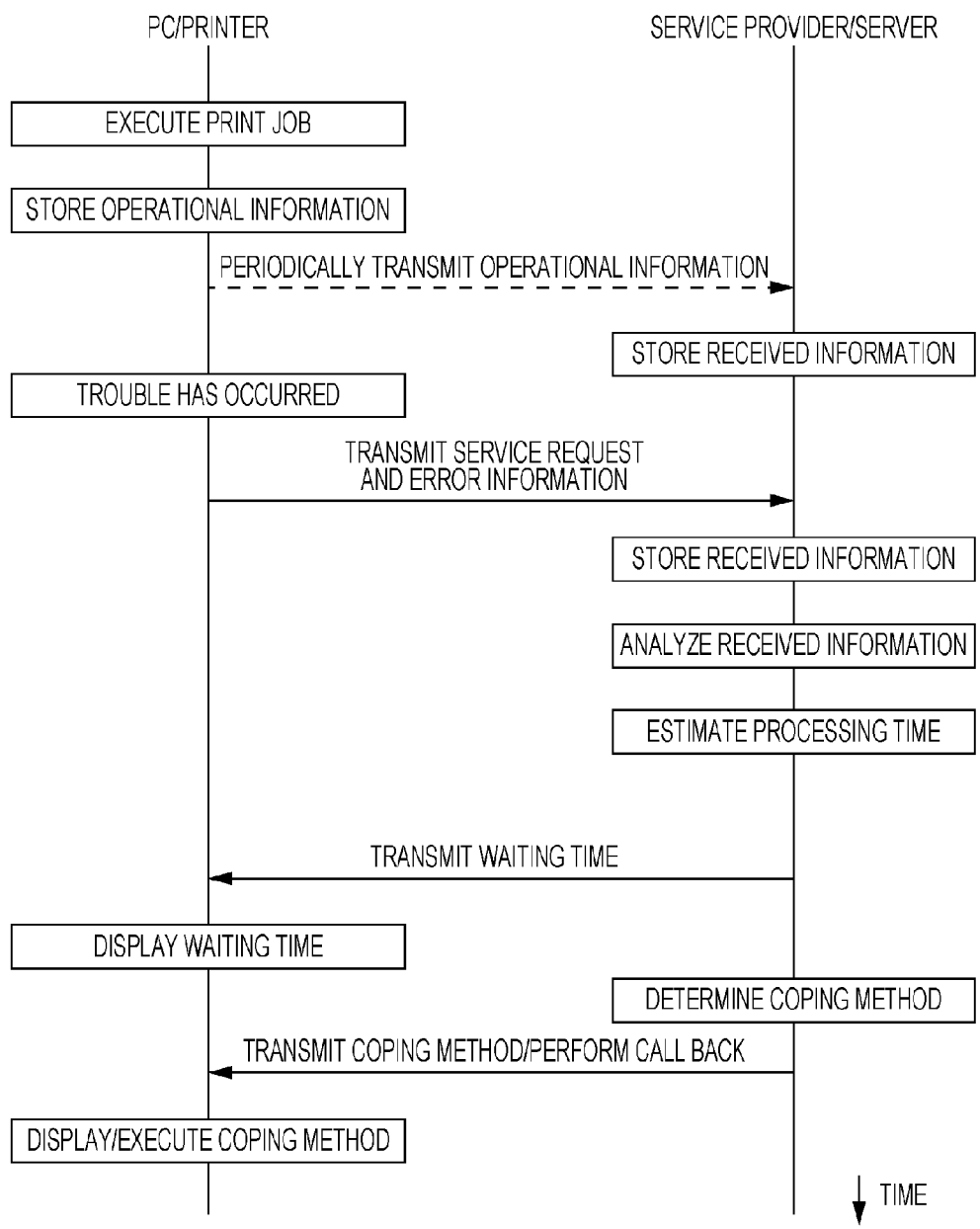
FIG. 6 is a diagram illustrating a status of communication between a computer and a sever apparatus, according to an embodiment of the invention.

FIG. 6 is a diagram illustrating a status of communication between the computer 3 and the sever apparatus 1. More specifically, FIG. 6 is a diagram illustrating a status of communication which is performed in this information communication system 100 and which is realized by combining the computer 3 side operation and the server apparatus 1 side operation which have been described above. A flow of data in this information communication system 100 will be described while referring to FIG. 6.

A computer 3 which manages a printer 5 executes a print job in accordance with a request from a user to cause the printer 5 to perform printing processing, and continually stores pieces of operational information related to the printer 5, which varies along with the printing processing performed by the printer 5. Further, the computer 3 periodically transmits a set of operational information related to the printer 5 to the server apparatus 1. At the server apparatus 1 side, the set of operational information having been received is stored and accumulated in the operational information accumulation unit 121. Such a transmission of a set of operational information is carried out, not on the basis of any operation performed by a user, but at each of predetermined timing points. In addition, as described next, when a trouble has occurred in the printer 5 and a user has made a service request, a set of operational information related to the printer 5 is transmitted together with the service request. Accordingly, in provision of a maintenance service, it is not an essential requirement that a set of operational information is transmitted at a timing point not based on a user's request.

When, however, a set of operational information is transmitted not only on a user's request basis, but also on a periodic basis, there are merits described below. That is, since a set of operational histories related to the printer 5 is continually transmitted to the server apparatus 1, and is stored and accumulated in the server apparatus 1, the identification of a cause of a trouble is made easier. Further, through a method which causes the server apparatus 1 to monitor an operational status of the printer 5 even when there occurs no trouble in the printer 5, it is possible to provide the user with a set of service information which is useful and suitable for the status. Through this method, users can receive appropriate maintenance service. Further, from a viewpoint of a service provider side, it becomes possible to more effectively perform remote monitoring of each of the large number of printers 5 and 6 communicably connected to the communication line 2 by collecting sets of operational information which are periodically transmitted from the printers 5 and 6, and performing statistical processing on the collected sets of operational information.

When a trouble of some kind has occurred in the printer 5 and a user has performed an input operation for making a service request, a set of operational information and a set of error information, which are related to the printer 5 and which consist of pieces of information at the time when the trouble has occurred, are transmitted from the computer 3 to the server apparatus 1 together with a service request signal. These sets of information are stored and preserved in the server apparatus 1, which analyzes the preserved sets of information. When a required processing time has been estimated from the sets of information, a piece of waiting time information is transmitted from the server apparatus 1 to the computer 3. The computer 3 displays a waiting time indicated by the piece of waiting time information on the display unit 332 to notify it to the user. It is preferable that the waiting time is displayed while being counted down along with an elapse of time. When any change has occurred in the waiting time, a notification for notifying the change is transmitted from the server apparatus 1 to the computer 3, and the indication on the display unit 332 is updated in accordance with the notification. In this manner, the user can know an approximate period of time required until the user can receive a response to the service request from the service provider.

When a method of coping with the trouble has been determined by the service provider, the method of coping with the trouble is transmitted from the server apparatus 1 to the computer 3 as a piece of service information. The piece of service information in this case can be made, for example, a piece of information which guides works required to eliminate the trouble to the user. Further, methods of coping with the trouble, each associated with a corresponding one of various error contents, are accumulated as a database in the service information accumulation unit 123 of the server apparatus 1. Thus, when a method of coping with the trouble in accordance with the status of the relevant printer 5 exists in the service information accumulation unit 123, the method of coping with the trouble can be transmitted as a piece of service information. Further, an engineer may newly formulate and create a method of coping with the trouble when needed. A result of the analysis having been made by the engineer is accumulated in the failure information accumulation unit 122 as a new piece of failure information, and the method of coping with the trouble is accumulated in the service information accumulation unit 123. Through this configuration, when any error of similar kind has occurred afterward, the server apparatus 1 becomes capable of automatically coping with the trouble.

Further, the server apparatus 1 may be configured to transmit, as a piece of service information, a piece of information which causes the printer 5 to perform maintenance operation of some kind to the printer 5, when, as a result of the analysis of the set of operational information, it has been decided that the maintenance operation in the printer 5 is required. Upon reception of the piece of service information, the printer 5 performs predetermined maintenance operation or maintenance operation designated by the received piece of service information. As the maintenance operation, there are various operations for eliminating errors, such as a cleaning operation for cleaning the printing head, a change operation for changing control voltages applied to individual portions of the apparatus. As described above, the piece of service information provided by the server apparatus 1 may be a piece of information targeted for, not only a notification to the user, but also a request to the printer 5 itself.

Further, a maintenance service provided to a user can employ, not only a method of providing a piece of service information via the computer 3, but also a method of allowing the service provider to directly make a notice to the user by a communication means, such as telephone, facsimile, or e-mail. In this case, a waiting time is clearly indicated, and thus, the user can use the waiting time effectively.

Figure 7A:
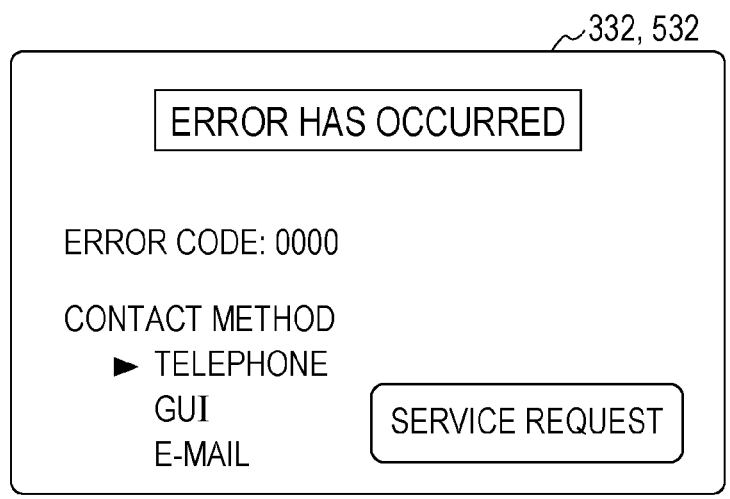
FIG. 7A and FIG. 7B are diagrams illustrating examples of a display screen according to an embodiment of the invention.
Figure 7B:
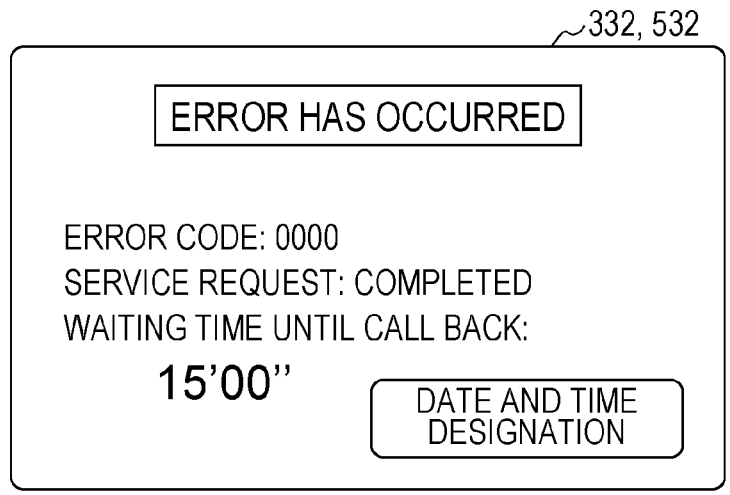

FIGS. 7A and 7B are diagrams illustrating examples of a display screen. FIG. 7A illustrates an example of the service request screen which is displayed when an error has occurred in the printer 5 (step S105 in FIG. 4). At this time, a message for notifying that an error has occurred in the printer 5 is displayed on the display unit 332 of the computer 3. Simultaneously therewith, an error code corresponding to the content of the error, and options for a contact method for use in reception of a response to the service request are displayed. Moreover, a "service request" button, which is used by a user when the user indicates an intention to desire a service provision to a service provider, is displayed. When the service request button has been operated, a service request signal, a printer ID, a set of error information, and a set of operational information at the time when the error has occurred are transmitted from the computer 3 to the server apparatus 1.

FIG. 7B illustrates an example of display of a piece of waiting time information which is transmitted from the server apparatus 1 as a response to a service request. Messages for notifying that an error has occurred and a service request has already been transmitted are displayed on the display unit 332. Further, in the case where, in the service request, a user selects, for example, telephone as a contact method, a waiting time until reception of a call back to the user from an operator of a service center is displayed. In the case where any other contact method is selected, similarly, a waiting time until reception of a call back to the user from an operator of a service center is displayed. If the displayed waiting time is counted down with an elapse of time, it becomes easier for the user to grasp a call-back reception time point.

Moreover, a "date and time designation" button is provided so that a date and time of a call back, designated by the sever apparatus 1, can be changed in accordance with a user's desire. Through the use of this date and time designation button, a user can change the date and time designated by the sever apparatus 1 so that the user can receive a notice from a service center at a time convenient to the user. A piece of date and time information having been set by the user is transmitted to the server apparatus 1, where rescheduling based on the piece of date and time information having been set by the user is performed and, as a result, it becomes possible for an operator to make a notice to the user at a date and time desired by the user. In addition, as described above, these indications may be displayed by the display unit 532 of the printer 5.

As described above, in this embodiment, when an error has occurred in one of the printers 5 and 6 and a user has made a request for a service provision to a maintenance service provider, a set of operational information which varies along with operating of the printer 5 or the printer 6 is transmitted to the server apparatus 1 via the communication line 2, together with a service request signal. Thus, when a service request has been made, not only just a fact of the occurrence of the error, but also operational status of the printer at the time of the occurrence of the error, are transmitted to the service provider. Thus, it is possible for the service provider to objectively and correctly understand the status of the printer without depending on an explanation by a user and thereby provide an appropriate service; while it is possible for the user to receive a maintenance service suitable for the status of the printer without providing any detailed explanation. Accordingly, it is possible to realize a maintenance service which is efficient for both of the service provider and the user.

Further, the user is provided with a piece of information related to a waiting time until reception of a notice of some kind from the service provider, and thus, the user can effectively use the waiting time. This waiting time is estimated on the basis of a transmitted set of operational information, and thus, at a time point when the waiting time has elapsed, the user can receive a set of information which is useful in elimination of a problem. The provision of a set of information based on the status of the printer 5 makes it possible to shorten a period of time required until resolution of a problem to a greater degree, as compared with the aforementioned existing technology in which, regardless of the status of the printer, merely only a waiting time is presented as a piece of information.

Further, the aforementioned information communication system 100 is an information communication system including information processing apparatuses, such as the PCs 3 and 4 and the printers 5 and 6, and the server apparatus 1 which is communicably connected to a communication line and which constitutes at least a portion of a service providing entity. According to such a configuration, the server apparatus 1, which has received a set of operational information having been transmitted, together with a service request, from one of the information processing apparatuses, can understand the status of the information processing apparatus by analyzing the content of the received set of operational information. The service providing entity can provide an appropriate service on the basis of a result of the analysis. Thus, according to this configuration, it is possible to realize a maintenance service which is efficient and highly convenient for both of the service provider and the user.

Further, in this embodiment, it is made possible for a user to make a service request by using a service request screen which is displayed only when an abnormal condition has occurred in the printer 5, and thereby, it is prevented that a useless service request is transmitted to the server apparatus 1 when there is no abnormal condition in the printer 5. Further, when a service request is made, pieces of useful information for identifying a cause of the error are provided to the server apparatus 1 by transmitting a set of operational information and a set of error information indicating the content of the error to the server apparatus 1 together with a signal indicating the service request, and thus, it becomes possible to more efficiently perform identification of a cause of the error and searching for a method of coping with the error.

As described above, in this embodiment, a unified object constituted by one of the computers 3 and one of the printers 5 which is directly and communicably connected to the one of the computers 3, as well as a single object constituted by the printer 6, functions as the "information processing apparatus" according to the first aspect of the invention. Further, the server apparatus 1 functions as the "service providing entity" according to the first aspect of the invention. Here, the "service providing entity" is a concept encompassing both of a service provider, such as an individual or a company which provides a maintenance service, and a service providing apparatus, such as a computer, which has such a service function. Further, the printing engine 541 included in each of the printers 5 and 6 functions as both of the "information processing unit" and the "image formation unit" according to the first aspect of the invention, and the sensors 542 and the counters 543 included in each of the printers 5 and 6 each function as the "information acquisition unit" according to the first aspect of the invention.

Further, in the configuration in which the operation unit 331 included in each of the computers 3 and 4 receives a service request, the operation unit 331 functions as the "reception unit" according to the first aspect of the invention, and the communication unit 333 functions as the "communication unit" according to the first aspect of the invention. In the configuration in which the operation unit 531 included in each of the printers 5 and 6 receives a service request, the operation unit 531 functions as the "reception unit" according to the first aspect of the invention, and the communication unit 533 functions as the "communication unit" according to the first aspect of the invention. Further, in the configuration in which the display unit 332 included in each of the computers 3 and 4 displays a set of service information, the display unit 332 functions as the "notification unit" according to the first aspect of the invention. Further, in the configuration in which the display unit 532 included in each of the printers 5 and 6 displays a set of service information, the display unit 532 functions as the "notification unit" according to the first aspect of the invention. Further, the data accumulation unit 12 included in the server apparatus 1 (particularly, the operational information accumulation unit 121 included in the data accumulation unit 12) functions as the "storage unit" according to the second aspect of the invention.

It is to be noted that the invention is not limited to the aforementioned embodiment, and various modifications other than the aforementioned ones can be made on the invention within the scope not departing from the gist of the invention. For example, the above set of operational information related to a printer, which, in the aforementioned embodiment, is transmitted from a computer or the printer to the server apparatus when a service request is made, is just an example. A set of operational information related to a printer is not limited to the above set of operational information.

Further, in the aforementioned embodiment, a maintenance service which is provided from a service provider in response to a service request from a user is a maintenance service provided via the communication line 2 or a maintenance service via a communication means, such as telephone. A maintenance service which can be provided by the service provider, however, is not limited to such a maintenance service. For example, in a maintenance service which, when a failure has occurred in the printer 5, copes with the failure by dispatching a service personnel, the aforementioned system is effective. That is, when a dispatch of a service personnel is requested by an input operation by a user, it becomes possible for the service personnel to understand the status of the printer 5 in advance and promptly cope with the failure by using a set of operational information related to the printer 5, which has been received together with the request for the dispatch of a service personnel.

Further, the information processing apparatus in the aforementioned embodiment includes the printing engine 541 employing an ink jet method, as the "information formation unit" according to the first aspect of the invention, but a printing method for the "information formation unit" is not limited to the ink jet method, and can be optionally determined. Moreover, the "information processing apparatus" according to the first aspect of the invention is not limited to an entity including a printing function such as described above, and various types of electronic devices which can be directly or indirectly connected to the communication line 2 can be each incorporated into the information communication system 100 as the "information processing apparatus" according to the first aspect of the invention. In particular, an electronic device including movable parts, parts to which high voltages are applied, and/or the like, is preferred to be incorporated into the information communication system according to the second aspect of the invention.

The entire disclosure of Japanese Patent Application No. 2014-064823, filed Mar. 26, 2014 is expressly incorporated by reference herein.

What is claimed is:

1. An information processing apparatus comprising:
an information processing unit that includes a processor;

an information acquisition unit that includes the processor and that acquires a set of operational information which varies along with operation of the information processing unit;

a reception unit that receives an input operation for requesting an external service providing entity to provide a maintenance service for the information processing apparatus; and a communication unit that includes a function of communicating with the service providing entity via a communication line, and that, in response to the input operation, transmits a signal for requesting the provision of the maintenance service, as well as the set of operational information, to the service providing entity, wherein the signal for requesting the provision of the maintenance service is sent before a request for the signal is transmitted from the external service providing entity.

2. The information processing apparatus according to claim 1, wherein the reception unit receives the input operation when there is an abnormal condition in the information processing unit.

3. The information processing apparatus according to claim 2, wherein the communication unit transmits the set of operational information including a content of the abnormal condition in the information processing unit.

4. The information processing apparatus according to claim 1, wherein the information processing unit includes an image formation unit that forms an image based on image data on a recording medium.

5. The information processing apparatus according to claim 1, further comprising a notification unit that notifies information which is transmitted, in response to the signal, by the service providing entity.

6. An information communication system comprising:
the information processing apparatus according to claim 1; and
a server apparatus that is communicably connected to the communication line, and that constitutes at least one portion of the service providing entity.

7. An information communication system comprising:
the information processing apparatus according to claim 2; and
a server apparatus that is communicably connected to the communication line, and that constitutes at least one portion of the service providing entity.

8. The information communication system according to claim 6, wherein the server apparatus transmits a set of service information in accordance with a content of the set of operational information.

9. The information communication system according to claim 7, wherein the server apparatus transmits a set of service information in accordance with a content of the set of operational information.

10. The information communication system according to claim 8, wherein the set of service information includes a piece of information which is related to a start time point of a service provision and which is derived on the basis of the set of operational information.

11. The information communication system according to claim 9, wherein the set of service information includes a piece of information which is related to a start time point of a service provision and which is derived on the basis of the set of operational information.

12. The information communication system according to claim 8, wherein the information processing apparatus further includes a notification unit that notifies the set of service information.

13. The information communication system according to claim 9, wherein the information processing apparatus further includes a notification unit that notifies the set of service information.

14. The information communication system according to claim 6, wherein the server apparatus includes a storage unit that stores therein the set of operational information transmitted from the information processing apparatus, and the communication unit further transmits the set of operational information not on the basis of the input operation.

15. The information communication system according to claim 7, wherein the server apparatus includes a storage unit that stores therein the set of operational information transmitted from the information processing apparatus, and the communication unit further transmits the set of operational information not on the basis of the input operation.

16. A service providing method for providing an information processing apparatus which is communicably connected to a communication line with a maintenance service, the service providing method comprising:
receiving a set of operational information which varies along with operation of the information processing apparatus, as well as a service request, via the communication line at a processor of a server and before a request for a signal is transmitted from the external service providing entity;
creating a set of service information, by the server, to be transmitted to the information processing apparatus, on the basis of the set of operational information; and
transmitting the set of service information to the information processing apparatus in response to the service request received from the information processing apparatus.

17. The service providing method according to claim 16, wherein the creation of the set of service information and the transmission of the created set of service information are performed at a plurality of mutually different timing points.

18. The service providing method according to claim 16, wherein the set of service information includes a piece of information related to a start time point of a service provision.

19. The service providing method according to claim 16, wherein the set of service information includes a piece of information for use in eliminating an abnormal condition in the information processing apparatus.

* * * * *